United States Patent
Wang et al.

(10) Patent No.: US 12,132,697 B2
(45) Date of Patent: Oct. 29, 2024

(54) METHOD, APPARATUS, DEVICE AND STORAGE MEDIUM FOR REPOSTING

(71) Applicant: Beijing Bytedance Network Technology Co., Ltd., Beijing (CN)

(72) Inventors: Jinyi Wang, Beijing (CN); Yue Chen, Beijing (CN); Hao Qiu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/319,561

(22) Filed: May 18, 2023

(65) Prior Publication Data

US 2023/0388267 A1    Nov. 30, 2023

(30) Foreign Application Priority Data

May 25, 2022 (CN) .......................... 202210579221.3

(51) Int. Cl.
*G06F 15/16* (2006.01)
*G06F 16/958* (2019.01)
(Continued)

(52) U.S. Cl.
CPC ............ *H04L 51/52* (2022.05); *G06F 16/986* (2019.01); *G06Q 50/01* (2013.01)

(58) Field of Classification Search
CPC ..... H04L 51/52; G06F 16/986; G06F 16/958; G06Q 50/01
(Continued)

(56) References Cited

U.S. PATENT DOCUMENTS 10,547,675 B1 * 1/2020 Lewis ................ H04N 21/8586
2009/0234876 A1 * 9/2009 Schigel .................. G06Q 30/02
707/999.102
(Continued)

FOREIGN PATENT DOCUMENTS

CN         101916274 A    12/2010
CN         104052765 A     9/2014
(Continued)

OTHER PUBLICATIONS

"How To: Include Original Posts When Sharing Links on Facebook." Sylvester Computer Guy, Apr. 11, 2021, https://www.sylvestercomputerguy.com/how-to-include-original-posts-when-sharing-links-on-facebook/. (Year: 2021).*

(Continued)

*Primary Examiner* — Kaylee J Huang

(57) ABSTRACT

According to embodiments of the present disclosure, there is provided a method, apparatus, apparatus, and storage medium for reposting. In a method of reposting, a repost prompt for reposting a post is presented to the first user in response to determining that a predetermined repost condition is satisfied. The predetermined repost condition includes at least one of the following: the post has been previously reposted by the second user and the first and second users have an association; the number of times that the first user completely views the post exceeds a first threshold number; a positive evaluation of the post provided by the first user. The method further comprises causing the post to be reposted in response to a request by the first user. In this way, it is possible to provide an easy, efficient and flexible mechanism of reposting, which simplifies user operation and improves user experience.

15 Claims, 9 Drawing Sheets

(51) Int. Cl.
  *G06Q 50/00* (2012.01)
  *H04L 51/52* (2022.01)
(58) Field of Classification Search
  USPC .......................................... 709/206, 204, 203
  See application file for complete search history.

(56) References Cited

U.S. PATENT DOCUMENTS

| | | | | |
|---|---|---|---|---|
| 2014/0223462 | A1* | 8/2014 | Aimone | H04N 21/4788 |
| | | | | 725/10 |
| 2015/0134808 | A1* | 5/2015 | Fushman | G06Q 30/02 |
| | | | | 709/224 |
| 2015/0256636 | A1* | 9/2015 | Spivack | H04L 67/02 |
| | | | | 709/224 |
| 2016/0277352 | A1* | 9/2016 | Bradley | H04L 51/52 |
| 2019/0121518 | A1* | 4/2019 | Anima | G06F 3/04842 |
| 2019/0341048 | A1 | 11/2019 | Cheng et al. | |

FOREIGN PATENT DOCUMENTS

| | | |
|---|---|---|
| CN | 108984098 A | 12/2018 |
| CN | 111510557 A | 8/2020 |
| CN | 111526411 A | 8/2020 |
| CN | 111596991 A | 8/2020 |
| CN | 111752437 A | 10/2020 |
| CN | 111901221 A | 11/2020 |
| CN | 112069524 A | 12/2020 |
| CN | 112423026 A | 2/2021 |
| CN | 113111269 A | 7/2021 |
| CN | 113568616 A | 10/2021 |
| CN | 109992187 B | 12/2021 |
| CN | 113867593 A | 12/2021 |
| CN | 114071171 A | 2/2022 |
| CN | 114217707 A | 3/2022 |
| CN | 114861110 A | 8/2022 |
| CN | 114996613 A | 9/2022 |
| JP | 2020-042660 A | 3/2020 |

OTHER PUBLICATIONS

"How Tik Tok Forward Other People's Videos to Tik Tok", Millet, URL: https://shouyou.3dmgame.com/gl/319228.html, Sep. 7, 2021, pp. 1-5.

International Search Report received for PCT Patent Application No. PCT/CN2023/094872, mailed on Aug. 9, 2023, 6 pages (2 pages of English Translation and 4 pages of Original Document).

Office Action received for Chinese Patent Application No. 202210579221.3, mailed on Feb. 18, 2024, 14 pages (8 pages of English Translation and 6 pages of Original Document).

Office Action received for Chinese Patent Application No. 202210580711.5, mailed on Feb. 18, 2024, 20 pages (9 pages of English Translation and 11 pages of Original Document).

* cited by examiner

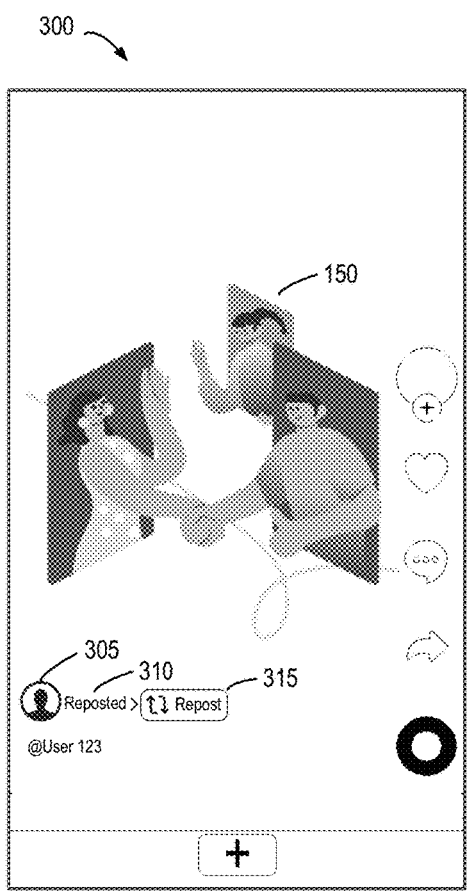
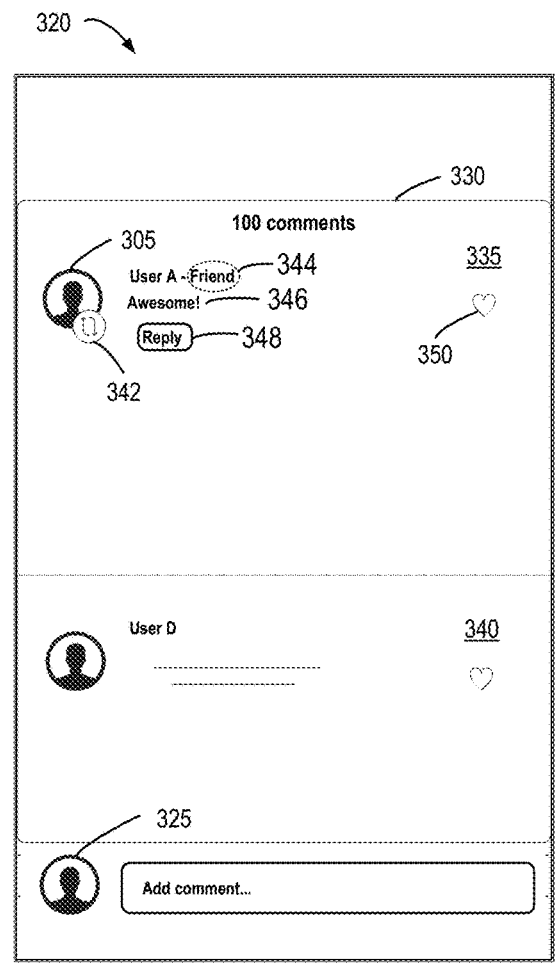
FIG. 3A
FIG. 3B

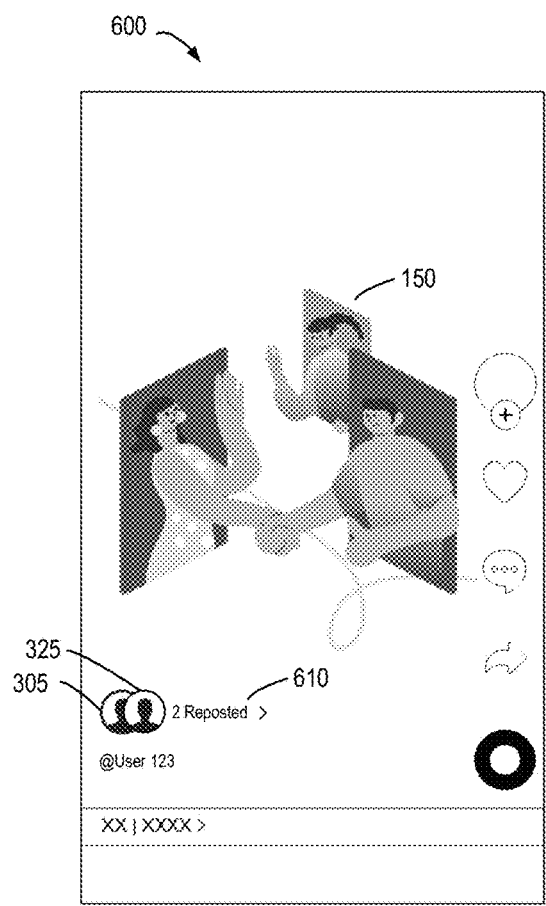
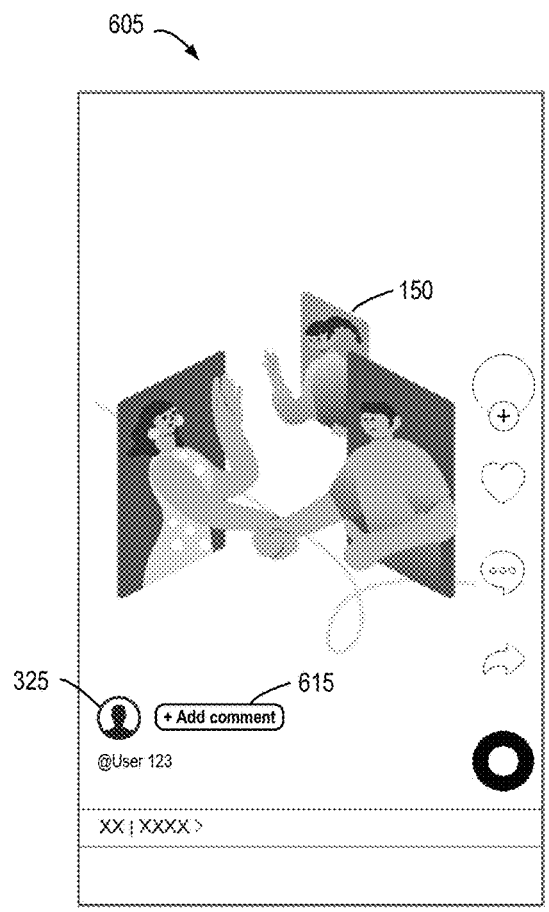
*FIG. 6A*  *FIG. 6B*

METHOD, APPARATUS, DEVICE AND STORAGE MEDIUM FOR REPOSTING

CROSS-REFERENCE TO RELATED APPLICATIONS

This application claims the benefit of CN Patent Application No. 202210579221.3 filed on May 25, 2022, entitled "METHOD, APPARATUS, DEVICE AND STORAGE MEDIUM FOR REPOSTING", which is hereby incorporated by reference in its entirety.

TECHNICAL FIELD

Example embodiments of the present disclosure relate generally to the computer technology, and specifically, to a method, apparatus, device, and computer-readable storage media for reposting.

BACKGROUND

More and more applications are currently designed to provide various services to users. User can perform various operations on applications. For example, users can create and publish posts in content sharing applications, such as text, video, images, image collections, audio and other multimedia content. In addition, users can perform various operations such as viewing, commenting, reposting and message interaction in applications. It is important to provide users with convenient approaches for such operations, such as efficiently reposting and commenting the posts.

SUMMARY

In a first aspect of the present disclosure, there is provided a method of reposting. The method comprises in response to a determination that a predetermined repost condition is satisfied, presenting, to a first user, a repost prompt for reposting a post, the predetermined repost condition comprising at least one of the following: the post is previously reposted by a second user and the first and second users have an association, the number of times that the first user completely views the post exceeds a first threshold number, a positive evaluation on the post by the first user; and in response to a repost request by the first user, causing the post to be reposted.

In a second aspect of the present disclosure, there is provided an apparatus for reposting. The apparatus comprises a repost prompt module configured to, in response to a determination that a predetermined repost condition is satisfied, present to a first user a repost prompt for reposting a post, the predetermined repost condition comprising at least one of the following: the post is previously reposted by a second user and the first and second users have an association, the number of times that the first user completely views the post exceeds a first threshold number, a positive evaluation on the post by the first user; and a reposting module configured to, in response to a repost request by the first user, causing the post to be reposted.

In a third aspect of the present disclosure, there is provided an electronic device. The apparatus comprising at least one processing unit; and at least one memory coupled to the at least one processing unit and storing instructions for execution by the at least one processing unit. The instructions, when executed by at least one processing unit, cause the electronic device to perform the method of the first aspect.

In a fourth aspect of the present disclosure, there is provided a computer-readable storage medium storing a computer program thereon. The computer program, when executed by a processor, carries out the method of the first aspect.

It is to be understood that the Summary is neither intended to identify key features or essential features of the present disclosure, nor is it intended to be used to limit the scope of the present disclosure. Other features of the present disclosure will be readily understood from the following description.

BRIEF DESCRIPTION OF THE DRAWINGS

The above and other features, advantages and aspects of the embodiments of the present disclosure will become more apparent in combination with the drawings and with reference to the following detailed description. In the drawings, the same or similar reference numbers represent denote the same or similar elements, where:

FIG. 3A illustrates a schematic diagram of an example user interface presenting repost prompts according to some embodiments of the present disclosure;

FIG. 3B illustrates a schematic diagram of an example user interface presenting a comment area according to some embodiments of the present disclosure;

FIGS. 6A and 6B show schematic diagrams of an example user interface for presenting an indication related to reposting and repost prompts and an example user interface for presenting an interface element for adding repost comments which are alternately displayed according to some embodiments of the present disclosure;

DETAILED DESCRIPTION OF EMBODIMENTS

Figure 1:
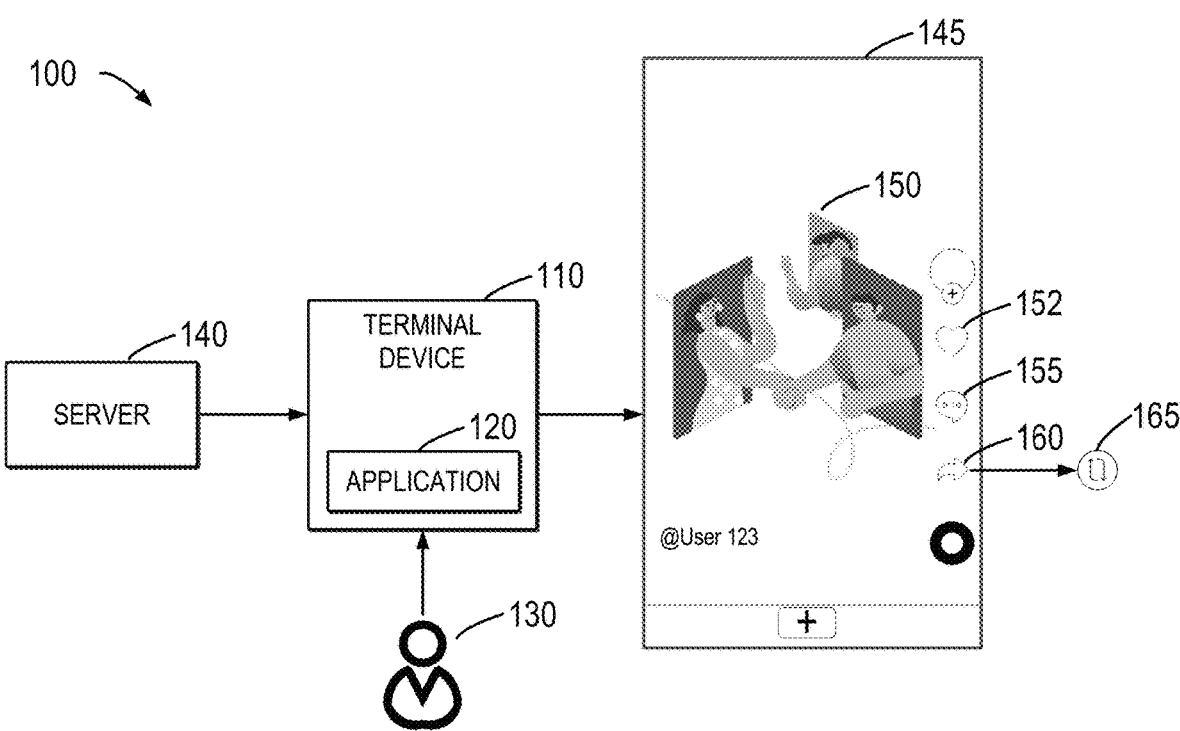
FIG. 1 illustrates a schematic diagram of an example environment in which embodiments of the present disclosure can be implemented.

Embodiments of the present disclosure will be described in more detail below with reference to the accompanying drawings. Although some embodiments of the present disclosure are shown in the drawings, it is to be understood that the present disclosure can be realized in various forms, and should not be interpreted as being limited to the embodiments set forth herein. On the contrary, these embodiments are provided for a more thorough and complete understanding of the present disclosure. It is to be understood that the drawings and embodiments of the present disclosure are only for example purposes and are not intended to limit the scope of protection of the present disclosure.

The term "post(s)" as used herein refers to multimedia content created by users, including text, sound, graphics, images, animation, video, etc.

The term "repost comments" as used herein refers to comments related to reposting actions. Such comments can be any content provided by a user and obtained while the user is reposting, or default content automatically generated when the user has no input. The term "regular comments" as used herein refers to comments provided by the user while viewing the post instead of reposting.

In the description of the embodiments of the present disclosure, the term "including" and similar terms shall be understood as open inclusion, that is, "including but not limited to". The term "based on" is to be understood as "based at least in part". The term "one embodiment" or "the embodiment" is to be understood as "at least one embodiment". The term "some embodiments" is to be understood as "at least some embodiments". Other explicit and implicit definitions may also be included below.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

FIG. 1 shows a schematic diagram of an example environment 100 in which embodiments of the present disclosure can be implemented.

In this example environment 100, an application 120 is installed in the terminal device 110. A user 130 may interact with the application 120 via the terminal device 110 and/or an attachment device of the terminal device 110. The application 120 may be a content sharing application that can provide services related to posts in the form of multimedia content for the user 130, such as viewing, commenting, reposting, creating (e.g., photographing and/or editing), publishing, and so on.

The terminal device 110 may be any type of mobile terminal, fixed terminal or portable terminal, including mobile phone, desktop computer, laptop computer, notebook computer, netbook computer, tablet computer, media computer, multimedia tablet, personal communication system (PCS) device, personal navigation device, personal digital assistant (PDA), an audio/video player, a digital camera/video camera, a positioning device, a television receiver, a radio broadcast receiver, an electronic book device, a game device, or any combination of the foregoing, including accessories and peripherals of these devices, or any combination thereof. In some embodiments, the terminal device 110 can also support any type of interfaces for the user (such as a wearable circuit, etc.).

In some embodiments, the terminal device 110 communicates with a server 140 to provide services of the application 120. The server 140 is various types of computing systems/servers capable of providing computing capabilities, including but not limited to mainframes, edge computing nodes, computing devices in a cloud environment, and the like.

It is to be understood that the structure and functions of the environment 100 are described only for the purpose of illustration and are not intended to be any limitation on the scope of the present disclosure.

In the environment 100, the user 130 is viewing a post 150 created by the user 123 on the user interface 145 provided by the terminal device 110. In this example, the application 120 is a video sharing application and the post 150 is a video. The user 130 may like the post 150 by clicking on the like control 152 and may view comments on the post 150 by clicking on a comment area control 155. The user 130 may also share (e.g., repost) the post 150 by clicking on a sharing control 160. For example, after the user 130 clicks on the sharing control 160, a reposting control 165 may be presented on the user interface 145 so that the user 130 can repost the post 150.

In reposting, it is desirable to conveniently, efficiently and flexibly repost posts. Embodiments of the present disclosure propose an interaction scheme for posts. In this scheme, if the predetermined repost condition is satisfied, a repost prompt is presented to the user. The repost conditions include at least one of the following: the post has been previously reposted by other users with an association relationship with the user, the number of times the user has completely viewed the post exceeds the threshold, and the positive evaluation (e.g., like) of the post input by the user.

In this way, users can be guided to use the reposting function based on the actions such as reposting, complete viewing and liking performed by associated users, so that the users can repost effectively and efficiently. Thus, the user operation is simplified and the user experience is improved.

Figure 2:
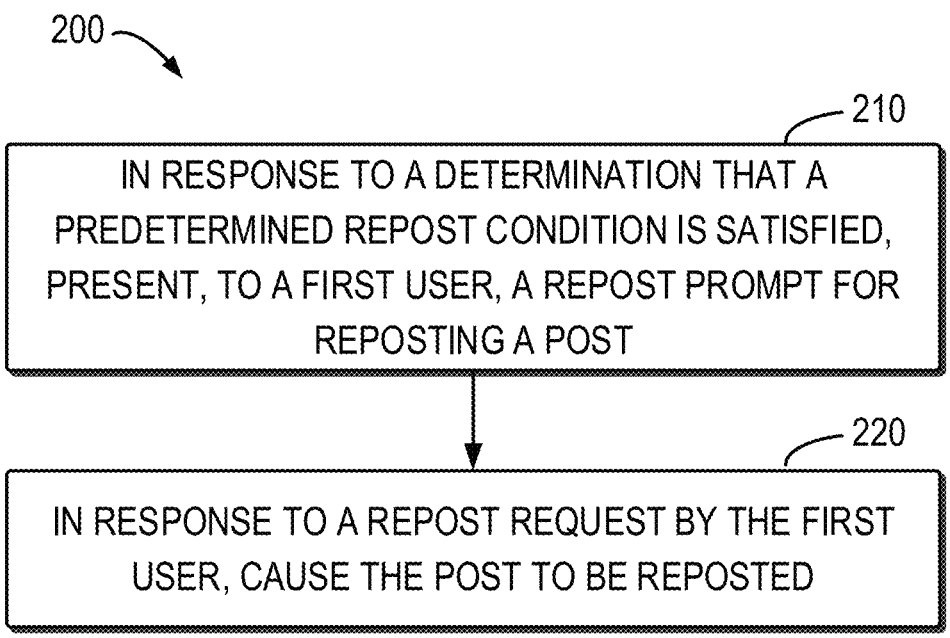
FIG. 2 illustrates a flowchart of a process for reposting according to some embodiments of the present disclosure.

FIG. 2 illustrates a flowchart of a process 200 for reposting according to some embodiments of the present disclosure. The process 200 can be implemented at the terminal device 110. For ease of discussion, process 200 will be described in connection with environment 100 of FIG. 1.

At block 210, in response to determining that a predetermined repost condition is satisfied, a repost prompt for reposting a post (e.g., the post 150 in FIG. 1) is presented to the user (referred to as "first user", e.g., the user 130 in FIG. 1).

According to embodiments of the present disclosure, the predetermined repost condition includes that the post has previously been reposted by another user (referred to as "second user") who has an association with the first user. The association between the first and second users may include a "follow" relationship in the social media such as a mutual follow friend relationship or one-way follow relationship (for example, a following acquaintance or a followed acquaintance). For example, the second user may follow the first user, or the first user may follow the second user. The first user and the second user may also have other associations.

If it is determined that the post has been reposted by the second user, a repost prompt is presented. In some embodiments, the repost prompt may be displayed in a user interface (e.g., user interface 145 in FIG. 1) that presents the post. The repost prompt can be implemented in any suitable manner. As an example, the repost prompt may be implemented as a reposting control 165 for triggering the reposting as shown in FIG. 1. Alternatively, or in addition, it is also possible to provide the repost prompt by highlighting the original reposting controls on the user interface. For example, the color and/or size of the sharing control 160 on the user interface 145 in FIG. 1 can be changed. Once the first user clicks on the sharing control 160, the presented reposting control 165 can be further highlighted, e.g., by changing its color and/or size.

It is observed that associated users may have some similarities. For example, they may have similar preferences. Thus, if a user reposts a post, a repost prompt can be presented to his/her associated users to guide them to repost. As such, the reposting by the user can be facilitated, thereby improving the user experience.

In some embodiments, an indication that the second user reposted the post can also be presented on the user page presenting the post. For example, the indication may be presented along with the repost prompt. Thus, the reposting can be displayed more conveniently.

FIG. 3A illustrates an example user interface 300 that presents repost prompts in accordance with some embodiments of the present disclosure.

In the user interface 300, the indication 310 that the second user (e.g., the user 305) reposted the post 150 is presented as "Reposted", for example. In this example, a reposting control 315 is also displayed in proximity of the indication 310 as a repost prompt for the first user to repost the post 150. If the first user exits the current user interface 300, the reposting control 315 is no longer displayed.

It is to be understood that the user interface 300 of FIG. 3A and the user interface and the display interface in other figures to be described later are merely examples, and various designs are feasible as well. For example, various graphical elements and/or controls in the interface may have different arrangements and different visual representations, one or more of which can be omitted or replaced, and one or more additional elements and/or controls can be presented. Moreover, any appropriate text content can be included in the interface. Embodiments of the present disclosure are not limited in this respect.

In some embodiments, in response to a predetermined operation by the first user on the indication 310, it is possible to jump to the comment area of the post 150. Within the comment area, at least one repost comment related to reposting of the post 150 can be displayed. The predetermined operation may include any appropriate operation such as clicking, swiping, touching or approaching, and the like. Thus, the information related to reposting can be presented and viewed in the comment area, so that the user can easily and quickly access and view the repost comments.

The repost comment can include a user input comment for reposting. It can also include a default repost comment which is generated without user input. The default repost comment may include any appropriate default text. As an example, description information indicating that the post has been reposted may be included, such as "this post has been reposted".

FIG. 3B illustrates an example user interface 320 that presents a comment area according to some embodiments of the present disclosure.

In this example, in response to the first user (e.g., the user 325) clicking on the repost prompt (e.g., the reposting control 315 in FIG. 3A), the comment area 330 is displayed where the first comment area 335 is dedicated to displaying the repost comments, and the second comment area 340 is dedicated to displaying the regular comments. The two comment areas 335 and 340 are separate from each other. By separately displaying the repost comments and regular comments, users can easily understand the situation of reposting and interact with the reposter.

In some embodiments, in order to further highlight the repost comment, the repost comment can be displayed on the top of the comment area 330. For example, as shown in FIG. 3B, the first comment area 335 is above the second comment area 340. The reposting icon 342 may also be displayed at the lower right corner of the avatar of the second user 305 to further highlight the repost comment.

In this example, as shown in FIG. 3B, a friend tag 344 is displayed near the name of the second user 305, "User A", indicating that the first and second users are friends. Also, the second user 305 provides a repost comment 346 for the reposting, e.g., "great!"

In some embodiments, like the regular comments, repost comment can be replied and liked. For example, in FIG. 3B, a reply control 348 and a like control 350 are arranged for the repost comment 346. Considering that the default repost comment is automatically generated rather than entered by the user, in some embodiments, the default repost comment cannot be replied. For example, the corresponding reply control is not displayed. Thus, the display space of the user interface can be effectively utilized.

By entering the comment area in aid of the indication reposted by the posts, the user can be provided with a more flexible way to access the comment area, and the user experience is improved.

Figure 3C:
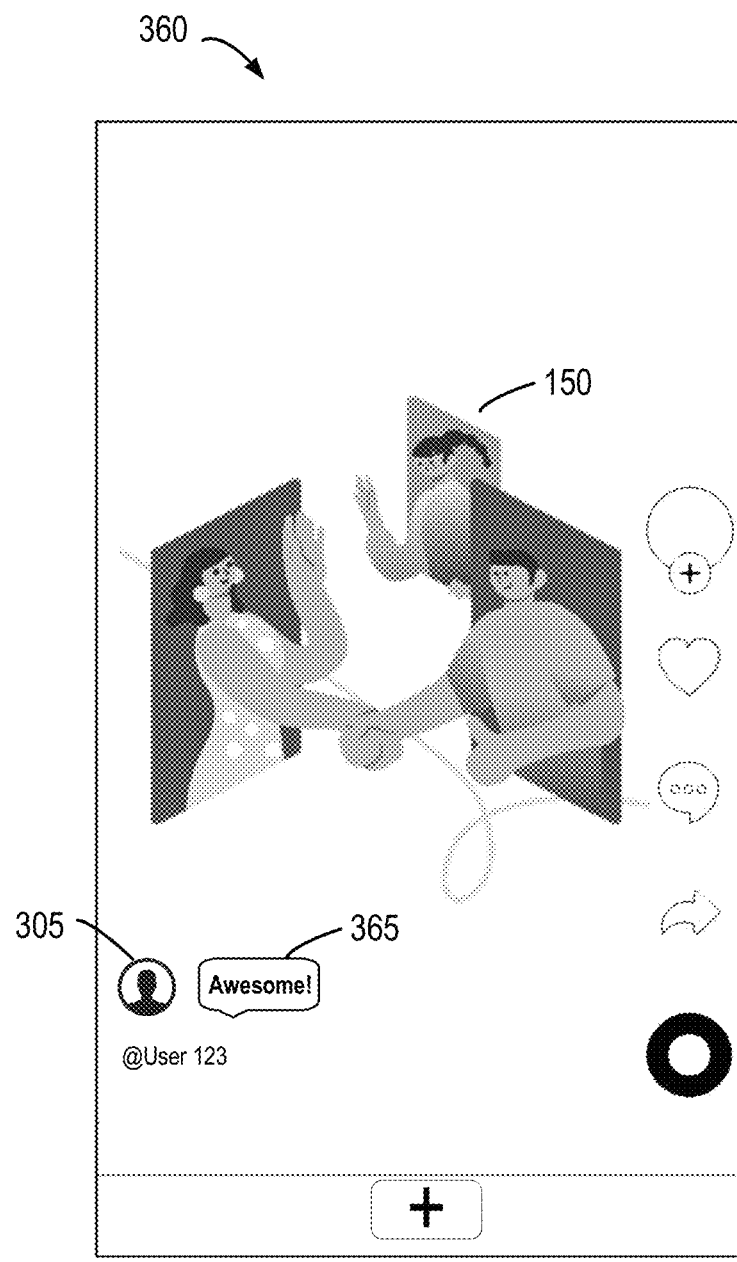
FIG. 3C illustrates a schematic diagram of an example user interface presenting repost comments according to some embodiments of the present disclosure.

In some embodiments where the second user provides a repost comment while reposting, the repost comment can be presented alternately with the indication as described above and the repost prompt in the user interface that presents the post. For example, the indication 310 and the reposting control 315 is first displayed on the user interface 300, as shown in FIG. 3A. Then the user interface 360 as shown in FIG. 3C is displayed, where the repost comment 365 of the second user is presented, e.g., "great!" Subsequently, the user interface 300 and the user interface 360 are alternately displayed.

In some embodiments, the post can be reposted by other users with associations with the first user other than the second user. In this case, it is possible to display identifications of a first group of users (e.g., the aggregated avatar of the first group of users or other forms of identifications) and the number of a second group of users (e.g., the additional number of users) among the plurality of users, as the indication that the posts are reposted by the plurality of users. The repost prompt can be presented along with such an indication.

Figure 4A:
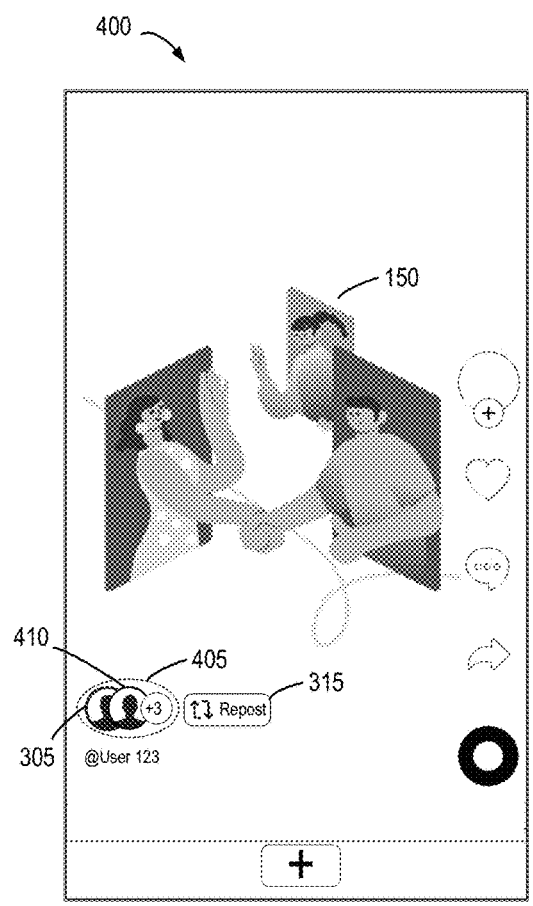
FIG. 4A illustrates a schematic diagram of an example user interface that presents a repost prompt in the case that a plurality of users repost a post according to some embodiments of the present disclosure.

FIG. 4A illustrates an example user interface 400 that presents a repost prompt where a post has been reposted by a plurality of users according to some embodiments of the present disclosure.

As shown in FIG. 4A, the indication 405 about the reposting includes the aggregated avatars of the second user 305 and another user 410 as well as a symbol "+3" indicating the number of other users who have reposted the post. In this example, it indicates that totally five users have reposted the posts 150. Every time one more user reposts the post, the number of the additional reposters can be incremented.

In this example, a reposting control 315 is presented in proximity of the indication 405 to guide the first user to repost the post 150. Similar to the indication 310 in FIG. 3A, it is possible to jump to the comment area through the indication 405 in FIG. 4A to view and access the repost comments of the post 150.

Reference is made back to FIG. 2. In addition to or instead of the post being reposted by the associated second user, the predetermined repost condition for determining the presentation of the repost prompt can include a condition that the number of time the first user completely views the post exceeds a threshold number (referred to as "first threshold number"). The first threshold number is configurable and can be set to any appropriate value. For example, in the environment 100 shown in FIG. 1, after the video post 150 is completely played more than a predetermined number of times (e.g., 2 times), a repost prompt will be presented to guide the first user to repost.

Alternatively, or in addition, the predetermined repost condition can include a positive evaluation by the first user on the post. For example, if the first user likes the post, or the first user's comment on the post contains predetermined keywords, such as "great", "good", "awesome", etc., it indicates that the first user likes or appreciates the post. In this case, a repost prompt for reposting can be presented.

Figure 4B:
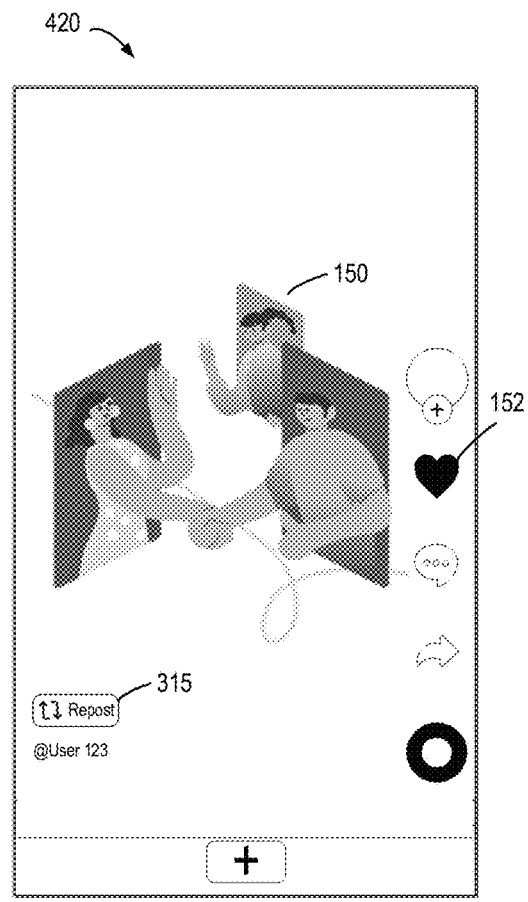
FIG. 4B illustrates a schematic diagram of an example user interface presenting a repost control according to some embodiments of the present disclosure.

By way of example, as shown in FIG. 4B, after the first user completely views the post 150 more than the first threshold number of times, or the first user likes the post 150 by clicking on the like control 152, the reposting control 315 is presented in the user interface 420.

A user's complete viewing of a post for many times, or a user's positive evaluation of a post, can indicate that the user likes or appreciates the post. In this case, presenting the repost prompt to the user can further facilitate the reposting, make the user's operation easier and improve the user experience.

In some embodiments, if it is determined that the number of times that the first user does not repost after giving positive evaluations on his/her viewed posts exceeds the threshold number of times (referred to as "second threshold number"), the presentation of the repost prompt is ceased. The second threshold number is configurable and can be set to any appropriate value.

For example, the repost prompt can be displayed after the first user likes the first N times (where N is any appropriate positive integer). If, however, the first user does not operate the repost prompt for N consecutive times, the repost prompt will no longer be presented. If the first user clicks on the repost prompt after liking, the counting can be reset.

The above predetermined repost conditions can be used in combination. For example, in some embodiments, it is possible to consider whether the post has been reposted and whether the first user likes the post. Alternatively, in some embodiments, it can be considered together whether the post has been reposted and whether the first user has viewed the post more than a predetermined number of times. In yet other embodiments, the combined condition is whether the first user has viewed the post more than a predetermined number of times and whether the first user likes the post. It is also possible to consider the above three conditions in combination.

Still with reference to FIG. 2, at block 220, the post is reposted in response to a repost request by the first user. For example, if the first user performs a predetermined operation (e.g., clicking, swiping, touching, approaching, etc.) on the repost prompt, it is determined that the first user requests to repost. Then the posted is caused to be reposted. As an example, after the first user clicks on the repost prompt, the reposting is initiated and the information on the reposting by the first user can be displayed on the user interface.

In some embodiments, if the first user uses the reposting function for the first time, a description of the functionality of repost comments can be displayed to the first user. For example, a prompt about adding the repost comment can be displayed. or compliance purpose, it is possible to also present an indication that the repost comment will be publicly visible.

Figure 5:
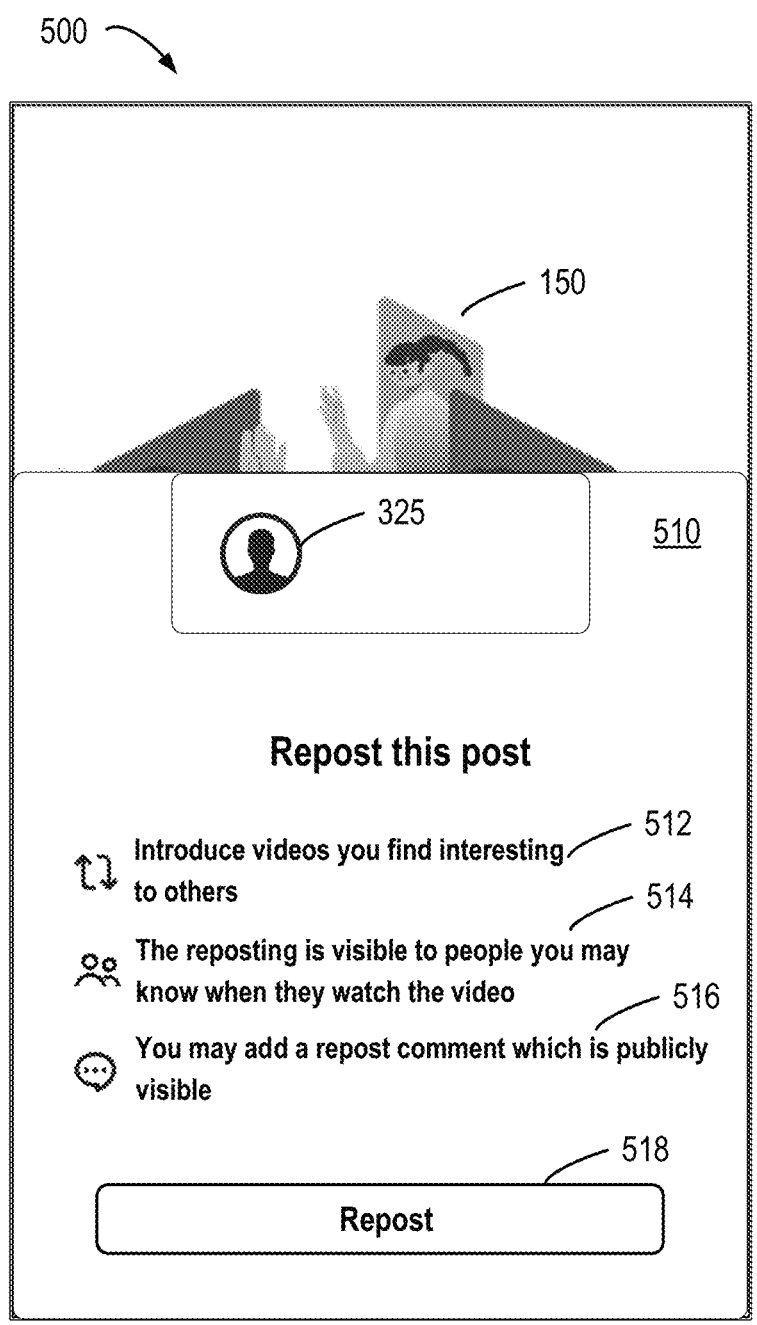
FIG. 5 illustrates a schematic diagram of an example user interface for presenting a description of the functionality of repost comments according to some embodiments of the present disclosure.

FIG. 5 illustrates an example user interface 500 for presenting a description of the functionality of repost comments according to some embodiments of the present disclosure.

As shown in FIG. 5, if the first user 325 has not used the reposting function before, a pop-up window 510 is presented when the first user 325 reposts the post 150, so as to present the relevant introduction of the reposting function. For example, if the first user 325 has not seen the pop-up window 510, the pop-up window 510 is displayed. If the first user 325 has used the reposting function or has already seen the pop-up window 510, the pop-up window 510 is no longer used, thereby simplifying the operation of reposing.

In the pop-up window 510, a description 512 about the reposting function can be included, for example, "Introduce videos you find interesting to others". Alternatively, or in addition, a description 514 of the functionality of the repost prompt, e.g., "The reposting is visible to people you may know when they watch the video". Alternatively, or in addition, a description 516 of the functionality of repost comment can also be included, e.g., "you can add a repost comment which is publicly visible." After the first user 325 clicks on a reposting confirmation button 518, the post 150 can be reposted.

In some embodiments where the post has been reposted by the second user, the interface element for adding the repost comment can be presented alternately with the indication that the post has been reposted (for example, the indication 310 in FIG. 3A), the repost prompt (for example, the reposting control 315 in FIG. 3A) and the repost comment (for example, the repost comment 365 in FIG. 3C), so that the first user can add the repost comment. In this example, the indication is updated to further indicate that the post is reposted by the first user.

The indication, repost prompt and the interface elements used to add repost comments can be displayed alternately so that the user can understand the reposting and can go to the comment area or add repost comments when necessary. In this way, the user can operate efficiently and flexibly, providing the user with convenience.

FIGS. 6A and 6B illustrate an example user interface 600 for presenting an indication related to reposting and repost prompts and an example user interface 605 for presenting interface elements for adding repost comments, which are alternately displayed, in accordance with some embodiments of the present disclosure.

In the user interface 600 as shown in FIG. 6A, the indication 610 is presented, indicating that the post 150 is presented by the second user 305 and the first user 325. In the user interface 605 as shown in FIG. 6B, an interface element 615 for adding repost comments is presented. The two user interfaces 600 and 605 are alternately displayed. If the first user 325 adds a reposted comment, the user interface for presenting the reposted comment can be also displayed alternately with the user interfaces 600 and 605.

If the first user operates the interface element 615, it is jumped to an interface area for inputting comments. In some embodiments, in consideration of the compliance requirements, when the first user enters the interface area of the input comments by operating the interface element 615 for the first time, an indication of "The added comments while reposting is publicly visible" can be displayed.

Figure 7:
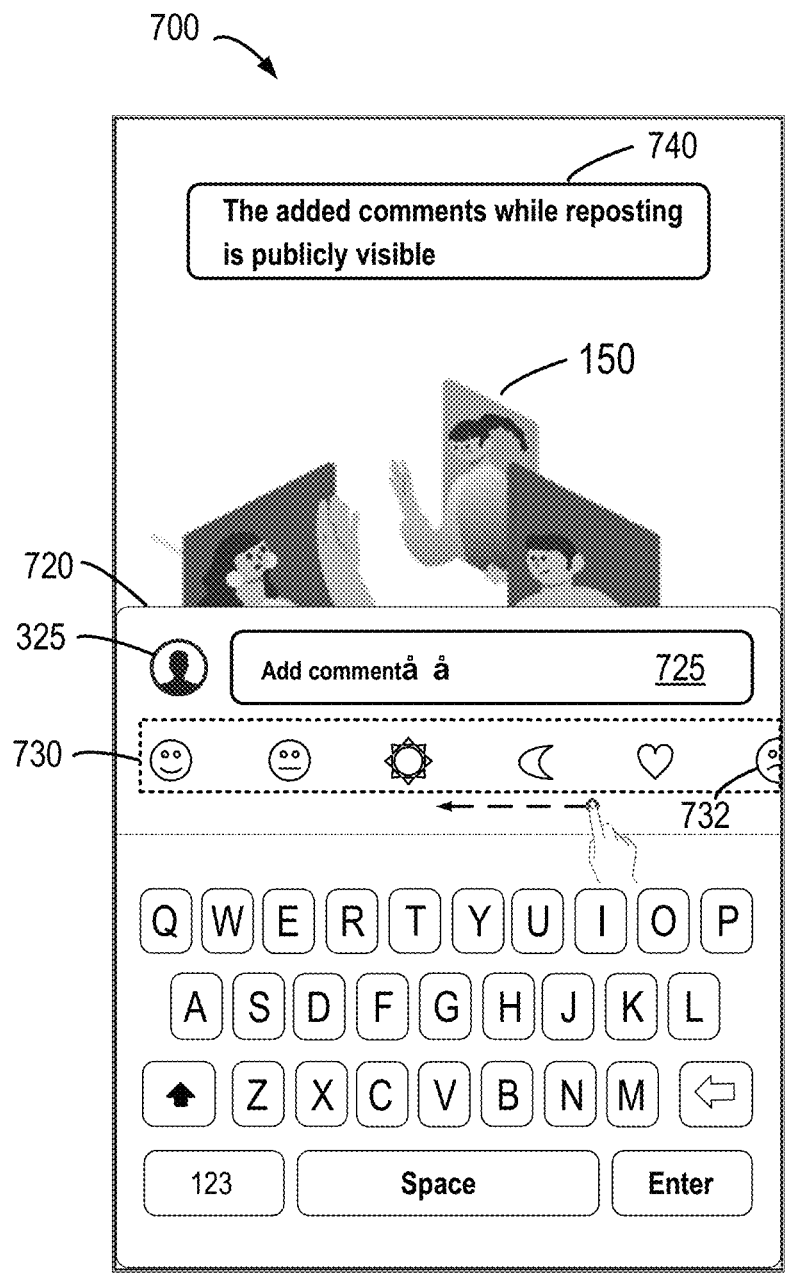
FIG. 7 illustrates a schematic diagram of an example user interface for adding repost comments according to some embodiments of the present disclosure.

FIG. 7 illustrates an example user interface 700 for adding a repost comment according to some embodiments of the present disclosure.

The user interface 700 is displayed after the first user 325 operates an interface element (e.g., the interface element 615 in FIG. 6b) for adding a repost comment, where an interface area 720 for inputting a comment is presented. The first user 325 may input a repost comment in an input box 725 of the interface area 720.

In FIG. 7, an emoticon sequence 730 is shown below the input box 725. In this example, the emoticon 732 at the end of the sequence is not fully displayed. At least one additional emoticon may be presented in response to a predetermined operation by the first user on the emoticon sequence 730. The predetermined operation may include, but is not limited to, clicking and swiping such as left swiping, right swiping, upward swiping, downward swiping, non-horizontal or vertical swiping, or any other appropriate operation.

In this example, if the first user clicks on the area where the emoticon sequence 730 is located and swipes in a predetermined direction (for example, to the left), the emoticon(s) which is not currently displayed can be displayed. In this way, it is possible to find more emoticons by performing a predetermined operation, thereby saving the limited display space of the user interface.

In some embodiments, for compliance purpose, an indication 740 of "the added comments while reposting is publicly visible" can be displayed when the first user enters the interface area 720 to input comments through the interface element for adding repost comments for the first time.

If the first user adds a comment, the interface element for adding the repost comment is no longer displayed, while the reposting-related indication and the repost prompt as well as the repost comments of all users continue to be displayed alternately.

Examples of alternate displays of an indication related to reposting, repost prompts and repost comments will be discussed below. In the case that the first user has not initiated the reposting, the avatar of the reposter, the additional number of users (for example, a symbol "+m" where m is a positive integer, indicating the additional number of users) and the repost prompt are alternately displayed with the repost comments of other users. In the case that the first user has initiated the reposting but has not added a repost comment, the aggregated avatar of the reposters, the symbol "+m" and the indication related to reposting are alternately displayed with the interface element guiding the addition of comments, and the repost comments of others. In the case that the first user has added a repost comment, the aggregate avatar of the reposters, the symbol "+m" and the indication related to reposting are displayed alternately with the repost comments of all users.

Figure 8:
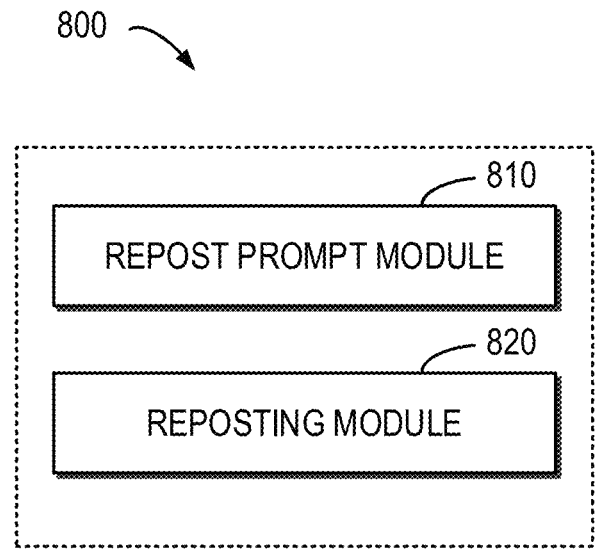
FIG. 8 illustrates a block diagram of an apparatus for reposting according to some embodiments of the present disclosure.

FIG. 8 shows a schematic structural block diagram of an apparatus 800 for presenting a post of art according to some embodiments of the present disclosure. The apparatus 800 may be implemented at or included in the terminal device 110. The various modules/components in the apparatus 800 may be implemented by hardware, software, firmware, or any combination thereof.

As shown, the apparatus 800 includes a repost prompt module 810 and a reposting module 820. The repost prompt module 810 is configured to, in response to a determination that a predetermined repost condition is satisfied, present to a first user a repost prompt for reposting a post, the predetermined repost condition comprising at least one of the following:

the post is previously reposted by a second user and the first and second users have an association, the number of times that the first user completely views the post exceeds a first threshold number, a positive evaluation on the post by the first user. The reposting module 820 is configured to, in response to a repost request by the first user, causing the post to be reposted.

In some embodiments, the repost prompt module 810 may be further configured to present the repost prompt in a user interface that presents the post.

In some embodiments, the repost prompt module 810 may be further configured to, in response to the post being previously reposted by the second user, present the repost prompt along with an indication that the post is reposted by the second user.

In some embodiments, the post may have been reposted by a plurality of users with an association relationship with the first user, and the plurality of users may include the second user. The indication may comprise an identifier of a first group of users from the plurality of users and the number of a second group of users from the plurality of users, to indicate that the post is reposted by the plurality of users.

In some embodiments, the apparatus 800 may further include a comment presentation module configured to, in response to a determination that the second user provides a repost comment while reposting, present the repost comment alternately with the indication and the repost prompt.

In some embodiments, the apparatus 800 may further include a comment adding module configured to, in response to the reposting by the first user, present an interface element for adding a repost comment alternately with the indication, the repost prompt and the repost comment, so that the first user can add a repost comment related to the reposting. The indication may be updated to further indicate that the post is reposted by the first user.

In some embodiments, the apparatus 800 may further include an addition ceasing module configured to, in response to the first user providing a repost comment to the post, cease presenting the interface element.

In some embodiments, the apparatus 800 may further include a prompt ceasing module configured to, in response to a determination that the number of times that the first user does not repost after providing positive evaluations on viewed posts exceeds a second threshold number, cease presenting the repost prompt.

It is to be understood that the features and effects of the process 200 discussed above with reference to FIGS. 1 to 7 are also applicable to the apparatus 800, and will not be repeated here. In addition, the modules included in the apparatus 800 may be implemented in various ways, including software, hardware, firmware, or any combination thereof. In some embodiments, one or more modules may be implemented using software and/or firmware, such as machine executable instructions stored on a storage medium. In addition to or as an alternative to machine executable instructions, some or all of the modules in the apparatus 800 may be implemented at least in part by one or more hardware logic components. By way of example and not limitation, example types of hardware logic components that may be used include a field programmable gate array (FPGA), an application specific integrated circuit (ASIC), an application specific standard (ASSP), a system on chip (SOC), a complex programmable logic device (CPLD), and the like.

Figure 9:
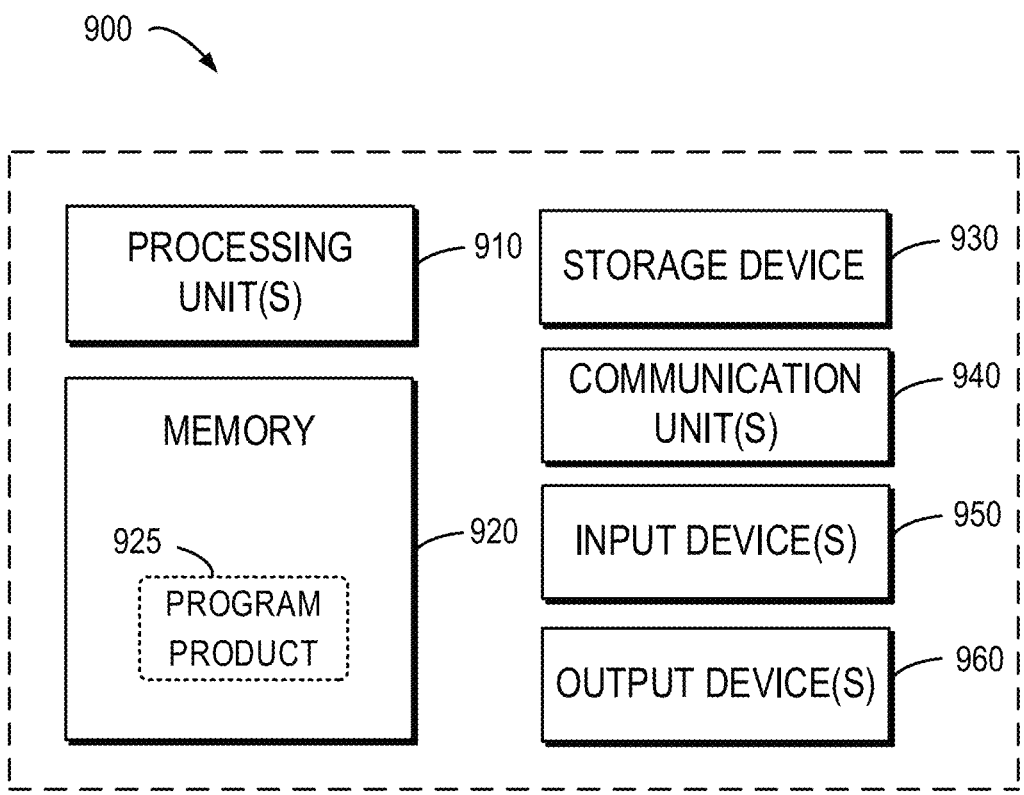
FIG. 9 illustrates a block diagram of an apparatus capable of implementing various embodiments of the present disclosure.

FIG. 9 shows a block diagram illustrating an electronic device 900 in which one or more embodiments of the present disclosure may be implemented. It is to be understood that the electronic device 900 shown in FIG. 9 is merely illustrative and should not constitute any limitation on the function and scope of the embodiments described herein. The electronic device 900 shown in FIG. 9 may be used to implement the terminal device 110 of FIG. 1.

As shown in FIG. 9, the electronic device 900 is in the form of a general-purpose computing device. The components of the electronic device 900 may include, but are not limited to, one or more processors or processing units 910, a memory 920, a storage device 930, one or more communication units 940, one or more input devices 950, and one or more output devices 960. The processing unit 910 may be a real or virtual processor and can perform various processes according to a program stored in the memory 920. In a multiprocessor system, a plurality of processing units execute computer executable instructions in parallel to improve the parallel processing capability of the electronic device 900.

The electronic device 900 typically includes a plurality of computer storage media. Such media may be any available media accessible to the electronic device 900, including but not limited to volatile and nonvolatile media, removable and non-removable media. The memory 920 may be volatile memory (e.g., register, cache, random access memory (RAM)), non-volatile memory (e.g., read only memory (ROM), electrically erasable programmable read only memory (EEPROM), flash memory), or some combination thereof. The storage device 930 may be a removable or non-removable medium, and may include a machine-readable medium, such as a flash drive, a magnetic disk, or any other medium, which may be capable of storing information and/or data (e.g., training data for training) and may be accessed within the electronic device 900.

The electronic device 900 may further include additional removable/non-removable, volatile/nonvolatile storage media. Although not shown in FIG. 9, a disk drive for reading or writing from a removable, nonvolatile disk (e.g., "floppy disk") and an optical disk drive for reading or writing from a removable, nonvolatile optical disk may be provided. In these cases, each driver may be connected to a bus (not shown) by one or more data medium interfaces. The memory 920 may include a computer program product 925 having one or more program modules configured to perform various methods or actions of various embodiments of the present disclosure.

The communication unit 940 enables communication with other computing devices through a communication medium. In addition, the functions of the components of the electronic device 900 may be implemented in a single computing cluster or a plurality of computing machines capable of communicating through a communication connection. Thus, the electronic device 900 may operate in a networked environment using logical connections with one or more other servers, network personal computers (PCS), or another network node.

The input device 950 may be one or more input devices, such as a mouse, a keyboard, a trackball, and the like. The output device 960 may be one or more output devices, such as a display, a speaker, a printer, and the like. The electronic device 900 may also communicate with one or more external devices (not shown), such as a storage device, a display device, and the like, through the communication unit 940 as needed, with one or more devices that enable the user to interact with the electronic device 900, or with any device (e.g., a network card, a modem, etc.) that causes the electronic device 900 to communicate with one or more other computing devices. Such communication may be performed via an input/output (I/O) interface (not shown).

According to an example implementation of the present disclosure, there is provided a computer-readable storage medium on which computer executable instructions are stored, where the computer executable instructions are executed by a processor to implement the methods described above. According to an example implementation of the present disclosure, there is also provided a computer program product that is tangibly stored on a non-transitory computer-readable medium and includes computer executable instructions that are executed by a processor to implement the methods described above.

Various aspects of the present disclosure are described herein with reference to flowcharts and/or block diagrams of methods, apparatuses, devices, and computer program products implemented in accordance with the present disclosure. It is to be understood that each block of the flowchart and/or the block diagram and combinations of blocks in the flowchart and/or the block diagram may be implemented by computer readable program instructions.

These computer readable program instructions may be provided to a processing unit of a general-purpose computer, a special-purpose computer, or other programmable data processing apparatus to produce a machine such that when these instructions are executed by a processing unit of a computer or other programmable data processing apparatus, means for implementing the functions/actions specified in one or more of the flow charts and/or block diagrams are generated. These computer-readable program instructions may also be stored in a computer-readable storage medium, which causes the computer, the programmable data processing apparatus and/or other devices to operate in a specific manner, so that the computer-readable medium in which the instructions are stored comprises an article of manufacture, which includes instructions to implement various aspects of the functions/actions specified in one or more of the flow charts and/or block diagrams.

Computer readable program instructions may be loaded onto a computer, other programmable data processing devices, or other devices to cause a series of operation steps to be performed on the computer, other programmable data processing devices, or other devices to generate a computer implemented processor instructions executed on other devices to implement the functions/actions specified in one or more blocks in the flowchart and/or block diagram.

The flowchart and block diagrams in the accompanying drawings show architectures, functions, and operations of possible implementations of systems, methods, and computer program products in accordance with various implementations of the present disclosure. In this regard, each block in the flowchart or block diagram may represent a part of a module, program segment or instructions, and a part of the module, program segment or instructions contains one or more executable instructions for implementing a specified logical function. In some alternative implementations, the functions indicated in the box may also occur in a different order than those indicated in the drawings. For example, two consecutive blocks may actually be performed substantially in parallel, and they may sometimes be performed in a reverse order, depending on the function involved. It should also be noted that each block in the block diagram and/or the flowchart, and the combination of the blocks in the block diagram and/or the flowchart, may be realized by a dedicated hardware based system that performs a predetermined function or action, or may be implemented by a combination of dedicated hardware and computer instructions.

The implementations of the present disclosure have been described above, and the above description is exemplary, not exhaustive, and is not limited to the disclosed implementations. Without departing from the scope and spirit of the described implementations, many modifications and changes will be obvious to those of ordinary skill in the art. The choice of terms used herein is intended to best explain the principles, practical applications or improvements to technologies in the market of each implementation, or to enable other ordinary technicians in the technical field to understand each implementation mode disclosed herein.

We claim:

1. A method of reposting comprising:
in response to a determination that a predetermined repost condition is satisfied, presenting, to a first user, a repost prompt for reposting a post, the predetermined repost condition comprising at least one of the following:
the post is previously reposted by a second user and the first and second users have an association, or
a number of times that the first user completely views the post exceeds a first threshold number;
in response to a repost request by the first user, causing the post to be reposted; and
in response to a determination that a number of times that the first user does not repost after providing positive evaluations on viewed posts exceeds a second threshold number, ceasing presenting the repost prompt.

2. The method of claim 1, wherein presenting the repost prompt comprises:
presenting the repost prompt in a user interface that presents the post.

3. The method of claim 2, wherein presenting the repost prompt comprises:
in response to the post being previously reposted by the second user, presenting the repost prompt along with an indication that the post is reposted by the second user.

4. The method of claim 3, wherein
the post is reposted by a plurality of users with an association with the first user, the plurality of users including the second user, and
the indication comprises an identifier of a first group of users from the plurality of users and a number of a second group of users from the plurality of users, to indicate that the post is reposted by the plurality of users.

5. The method of claim 3, further comprising:
in response to a determination that the second user provides a repost comment while reposting, presenting the repost comment, the indication, and the repost prompt in an alternating manner.

6. The method of claim 5, further comprising:
in response to the reposting by the first user, presenting an interface element for adding a repost comment, the indication, the repost prompt, and the repost comment in an alternating manner,
the indication being updated to further indicate that the post is reposted by the first user.

7. The method of claim 6, further comprising:
in response to a repost comment being provided by the first user to the post, ceasing presenting the interface element.

8. A non-transitory computer-readable storage medium storing a computer program thereon, the computer program, when executed by a processor, carrying out the method of claim 1.

9. An electronic device comprising:
at least one processing unit; and
at least one memory coupled to the at least one processing unit and storing instructions for execution by the at least one processing unit, the instructions, when executed by the at least one processing unit, causing the electronic device to carry out acts comprising:
in response to a determination that a predetermined repost condition is satisfied, presenting, to a first user, a repost prompt for reposting a post, the predetermined repost condition comprising at least one of the following:
the post is previously reposted by a second user and the first and second users have an association, or
a number of times that the first user completely views the post exceeds a first threshold number;
in response to a repost request by the first user, causing the post to be reposted; and
in response to a determination that a number of times that the first user does not repost after providing positive evaluations on viewed posts exceeds a second threshold number, ceasing presenting the repost prompt.

10. The electronic device of claim 9, wherein presenting the repost prompt comprises:
presenting the repost prompt in a user interface that presents the post.

11. The electronic device of claim 10, wherein presenting the repost prompt comprises:
in response to the post being previously reposted by the second user, presenting the repost prompt along with an indication that the post is reposted by the second user.

12. The electronic device of claim 11, wherein
the post is reposted by a plurality of users with an association with the first user, the plurality of users including the second user, and
the indication comprises an identifier of a first group of users from the plurality of users and a number of a second group of users from the plurality of users, to indicate that the post is reposted by the plurality of users.

13. The electronic device of claim 11, wherein the acts further comprise:
in response to a determination that the second user provides a repost comment while reposting, presenting the repost comment, the indication, and the repost prompt in an alternating manner.

14. The electronic device of claim 13, wherein the acts further comprise:
in response to the reposting by the first user, presenting an interface element for adding a repost comment, the indication, the repost prompt, and the repost comment in an alternating manner,
the indication being updated to further indicate that the post is reposted by the first user.

15. The electronic device of claim 14, wherein the acts further comprise:
in response to a repost comment being provided by the first user to the post, ceasing presenting the interface element.

* * * * *